March 24, 1931. G. F. KOEHLER 1,797,830
TURNTABLE
Filed Oct. 2, 1929   2 Sheets-Sheet 1
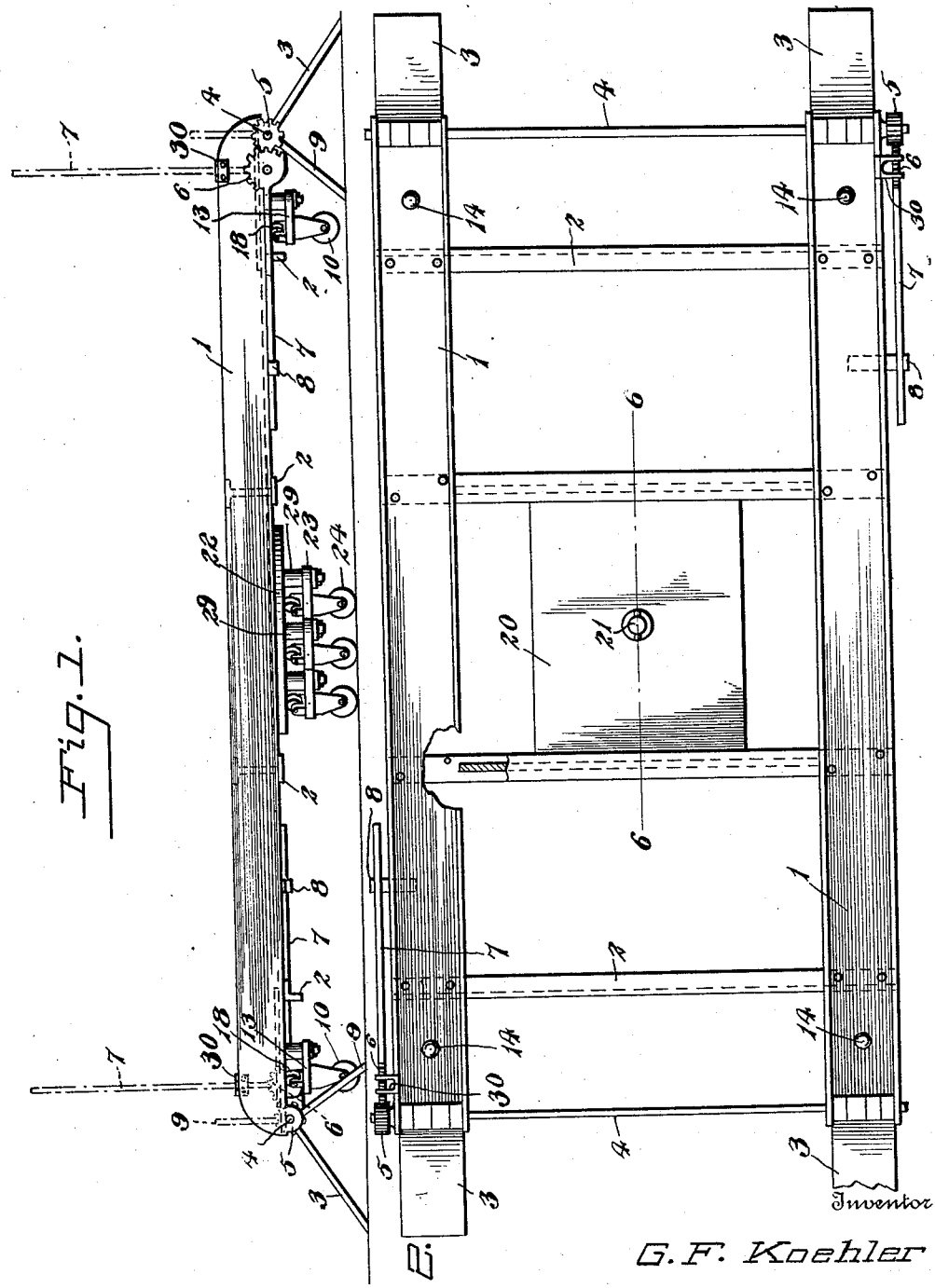
Inventor
G. F. Koehler
By Lacey & Lacey,
Attorneys March 24, 1931.  G. F. KOEHLER  1,797,830
TURNTABLE
Filed Oct. 2, 1929   2 Sheets-Sheet 2

Inventor
G. F. Koehler
By Lacey & Lacey, Attorneys

Patented Mar. 24, 1931

1,797,830

UNITED STATES PATENT OFFICE

GUSTAV F. KOEHLER, OF PLEASANTVILLE, NEW JERSEY

TURNTABLE

Application filed October 2, 1929. Serial No. 396,814.

This invention is a turntable for use in moving cars in small garages or other places where space is limited and it is difficult or inconvenient to turn a car completely around by the use of its power plant. The invention provides an inexpensive and efficient device whereby the car may be easily moved from place to place or turned around and will be held against rolling while being turned. The invention is illustrated in the accompanying drawings and resides in certain novel features which will be hereinafter first fully described and more particularly defined in the appended claims.

In the drawings:

Figure 1 is a side elevation of a turntable embodying the invention,

Fig. 2 is a plan view of the same.

Figures 5, 6:
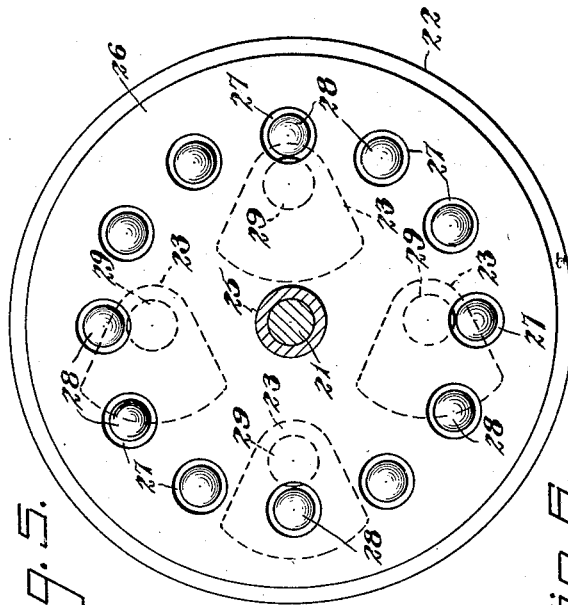
Fig. 5 is a plan view of the center bearing with the top plate removed.
Fig. 6 is a section on the line 6—6 of Fig. 2.

In carrying out the invention, I provide a pair of track members consisting of channeled bars 1 which are arranged in parallelism with their flanges projecting upwardly. These side bars or tracks are connected at intervals by cross bars 2 which are in the form of angle bars or I-bars, as will be understood upon reference to Fig. 1. At the ends of the tracks are hingedly connected skids 3 which, when turned to the position shown in Fig. 1, extend downwardly and outwardly from the respective tracks in alinement therewith so as to provide guides over which the wheels of the automobile may run as the car is being driven onto the tracks. The hinge connections between the skids and the tracks comprise shafts or hinge rods 4 which extend across the entire width of the turntable and are rigidly secured to the skids so that when the rod or shaft is rocked the skids will be moved upwardly or downwardly simultaneously. Upon one end of each rock shaft or hinge rod 4 is a pinion 5 with which meshes a segmental gear 6 which is rigid with one end of a lever 7 and is fulcrumed upon the adjacent track immediately adjacent the pinion, as shown in Fig. 1 and as will be understood. When the levers are in their lowered position, they rest in hooks or lugs 8 on the outer sides of the respective tracks and the skids will be in the position shown in Fig. 2 and in full lines in Fig. 1 to permit an automobile to be driven onto the tracks. It will be noted that in this position a stop member or extension 9 which is formed integral with the hinged end of each skid extends downwardly from the hinge and rests upon the ground or the garage floor under the respectively adjacent end of the track so that the track will be firmly supported and the skid will be held against slipping while a car is moving thereover. After a car has been driven onto the tracks, the levers are turned upwardly, as shown by dotted lines in Fig. 1, and the skids are thereby rocked so that their longer members will rest flat upon the respective tracks between the flanges of the same, while the shorter extensions 9 will project vertically upward and serve as stops against the wheels of the car to prevent the same rolling from the tracks. The levers are held in raised positions by latches 30 mounted in any manner upon the tracks and of any preferred form.

Figure 3:
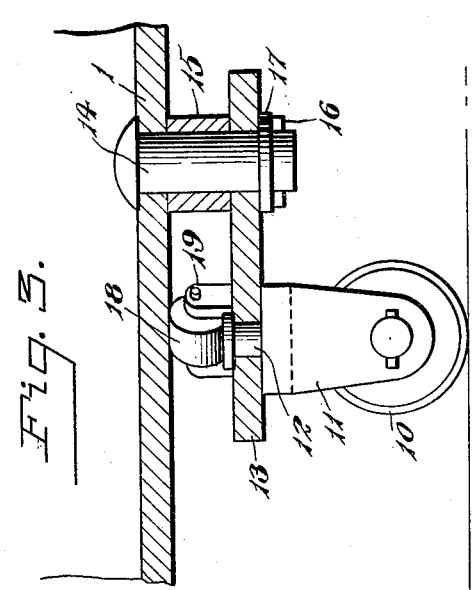
Fig. 3 is an enlarged detail sectional view of one of the corner rollers or casters.
Figure 4:
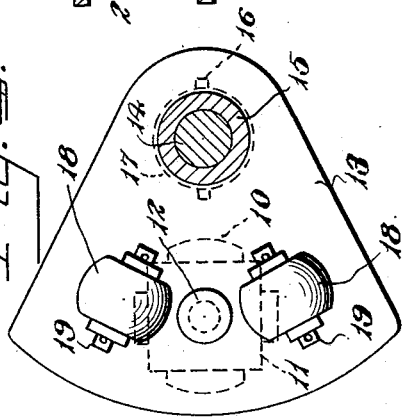
Fig. 4 is a bottom plan view of the same.

Adjacent each end of each track, there is disposed a caster 10 which is mounted in a yoke 11 having a stud 12 at its top which is fixed in a plane 13 preferably of triangular form and having its apex engaged pivotally with the lower end of a bolt 14 secured in the bottom of the respective track, as shown clearly in Fig. 3. A spacer 15 is disposed around the bolt 14 between the caster plate 13 and the track so as to maintain the spaced relation of the same and a pin or other retaining element 16 is engaged with the lower end of the bolt, a washer 17 being interposed between said element and the bottom of the caster plate, as shown. Upon the upper side of the caster plate 13 and disposed at opposite sides of the stud 12 are bearing rollers 18 interposed between the caster plate 13 and the track 1 whereby the weight of the track will be so distributed over the caster that canting or twisting of the caster will be avoided while at the same time free relative movement of the caster plate will be permitted so that the caster may trail freely when the turntable is being moved in any direction. In order to avoid binding of the bearing rollers 18, the axles 19 upon which they are mounted are disposed on extended radii of the bolt 14, as will be understood upon reference to Fig. 4.

The intermediate cross beams 2 are I-bars, as shown in Figs. 1 and 6, and disposed between and secured to these bars at the center of the same is a plate 20, at the center of which is mounted a king bolt 21 which is fixed to or formed integral with a lower plate 22 which may be cruciform in outline and to which are freely swiveled casters comprising plate yokes 23 arranged in rectangular relation and each carrying a caster wheel or roller 24. As shown most clearly in Fig. 1, these center casters are duplicates of the corner casters, shown in Figs. 3 and 4, and the parts are so disposed and proportioned that the rollers 24 work in a somewhat lower plane than the rollers or casters 10 and when the turntable is in a horizontal plane it will be carried solely by the center casters 24. It will thus be possible to move the turntable with a car thereon in any direction very easily or to turn the table about the center casters as a center so that the car will be turned around within a very limited space, and when the table and the car are to be thus moved the upstanding levers 7 serve as convenient handles whereby the operators may manipulate the device. A bushing 25 is provided around the king bolt 21 and extends through a central opening of the plate 20, as shown in Fig. 6, and said bushing constitutes a hub for a retaining plate 26 having openings 27 therethrough at intervals in a circular series, as shown clearly in Figs. 5 and 6. Playing freely in each opening 27 is a bearing ball 28 of such diameter that it will be in contact with the caster plate 22 and with the center plate 20 so that the caster plate may turn freely and frictional wear will be reduced to a minimum. It should also be noted that the dimensions of the yokes 23 are such that each may turn about its pivot 29 without interfering with or being interfered with by any of the other rollers. Ordinarily, the entire weight of the turntable and the car thereon will be borne by the center casters 24 but if the turntable should happen to dip at one end the casters 10 will impinge upon the ground to aid in sustaining the weight and permit the table and its load to be moved easily without scraping upon the floor. After the car has been brought into the desired position, the skids 3 at one end are swung downwardly so that the car may then move from the turntable to the garage floor or the ground surface. It is intended that the diameters of the casters be as short as practicable in order that the turntable may set as low as possible.

The device is exceedingly simple and compact in its construction and the arrangement of its parts so that it is not apt to get out of order and it will be found highly efficient for the purposes for which it is designed.

Having thus described the invention, I claim:

1. A turntable for automobiles comprising a pair of tracks, rolling supports for the tracks, and skids hinged to the ends of the tracks, the skids having angular extensions, and means for rocking the skids whereby the ends of the skids and of the extensions may engage a ground surface with the skids alined with the tracks or the skids may be disposed upon the tracks with the extensions projecting upwardly therefrom to retain a car upon the tracks.

2. A turntable comprising channeled tracks, means for maintaining the tracks in fixed spaced parallel relation, skids hinged to the ends of the tracks and connected whereby the skids at one end of the track will operate simultaneously, the skids having angular extensions adapted in one position of the skids to rest upon the ground surface and in another position of the skid to project upwardly from the tracks, gears fixed to the skids at the hinge mounting thereof, levers fulcrumed upon the tracks immediately adjacent said gears, and gears fixed to the levers concentric with the fulcrums of the same and meshing with the first-mentioned gears.

3. A turntable comprising parallel tracks, means for guiding a car onto the tracks and retaining it on the tracks, casters mounted on the under sides of the tracks at the ends of the same, a connection between the tracks at the centers thereof, and a plurality of casters carried by said connection centrally between the tracks, the last-mentioned casters being disposed to run in a lower horizontal plane than the first-mentioned casters.

4. A turntable comprising parallel tracks, means for directing a car onto the tracks and retaining it thereon, beams connecting the tracks at the centers thereof, a rigid plate secured to and between said beams, a caster plate disposed below and swiveled in said plate, a retainer plate disposed between said center plate and the caster plate and having a circular series of openings therein, bearing balls playing loosely in said openings and engaging the center plate and the caster plate, and a plurality of casters swiveled in the caster plate.

In testimony whereof I affix my signature.

GUSTAV F. KOEHLER. [L. S.].